US011996698B2

(12) United States Patent
Zang et al.

(10) Patent No.: US 11,996,698 B2
(45) Date of Patent: May 28, 2024

(54) CAPACITIVE POWER TRANSFER SYSTEM WITH INTEGRATED WIDE BANDWIDTH COMMUNICATION

(71) Applicant: Apple Inc., Cupertino, CA (US)

(72) Inventors: Shaoge Zang, Auckland (NZ); Zonghong Hu, Auckland (NZ); Saining Ren, Auckland (NZ); Ho Fai Leung, Auckland (NZ); Aiguo Hu, Auckland (NZ); Qi Zhu, Shanghai (CN); Botunga Arachchige Rajith Chaminda Abeywardana, Auckland (NZ); Lei Zhao, Xi'an (CN)

(73) Assignee: Apple Inc., Cupertino, CA (US)

( * ) Notice: Subject to any disclaimer, the term of this patent is extended or adjusted under 35 U.S.C. 154(b) by 21 days.

(21) Appl. No.: 17/819,668

(22) Filed: Aug. 15, 2022

(65) Prior Publication Data
US 2023/0198305 A1 Jun. 22, 2023

Related U.S. Application Data

(60) Provisional application No. 63/265,581, filed on Dec. 17, 2021.

(51) Int. Cl.
H02J 50/05 (2016.01)
H02J 50/40 (2016.01)
(Continued)

(52) U.S. Cl.
CPC .............. H02J 50/05 (2016.02); H02J 50/40 (2016.02); H02J 50/80 (2016.02); H04B 5/22 (2024.01); H04B 5/79 (2024.01)

(58) Field of Classification Search
CPC .. H02J 50/05; H02J 50/80; H04B 5/22; H04B 5/79
See application file for complete search history.

(56) References Cited

U.S. PATENT DOCUMENTS

2015/0256227 A1 9/2015 Teggatz et al.
2017/0373539 A1 12/2017 Von Novak, III et al.
(Continued)

FOREIGN PATENT DOCUMENTS

WO 2014-053930 A2 4/2014

OTHER PUBLICATIONS

Zonghong Hu et al.; "A Comparative Study of Different Compensation Topologies for Capacitive Power Transfer"; 2020 IEEE PELS Workshop on Emerging Technologies: Wireless Power Transfer (WoW); pp. 389-394, Nov. 15, 2020 [retrieved on Nov. 25, 2022], Retrived from https://doi.org/10.1109/WoW47795.2020.9291314.
(Continued)

Primary Examiner — Daniel Cavallari
Assistant Examiner — David A Shiao
(74) Attorney, Agent, or Firm — FLETCHER YODER PC

(57) ABSTRACT

A capacitive power transfer system can include a power transmitter having one or more primary side filter components, a communications modulator, and transmitter capacitive couplers; and a power receiver having receiver capacitive couplers capacitively coupled to the transmitter capacitive couplers, one or more secondary side filter components, and a communication demodulator. The one or more primary side filter components and the one or more secondary side filter components can be selected to provide power amplifier operation at a power delivery frequency and act as a stable gain high pass filter above a communications cutoff frequency that is higher than the power delivery frequency.

19 Claims, 4 Drawing Sheets

(51) Int. Cl.
*H02J 50/80* (2016.01)
*H04B 5/22* (2024.01)
*H04B 5/79* (2024.01)

(56) References Cited

U.S. PATENT DOCUMENTS

| | | | |
|---|---|---|---|
| 2020/0220576 A1* | 7/2020 | Richter | H04B 5/79 |
| 2021/0067204 A1* | 3/2021 | Asai | H01Q 7/00 |
| 2021/0075265 A1* | 3/2021 | Kanno | H02J 50/005 |
| 2021/0119486 A1* | 4/2021 | Kanno | H02J 50/05 |
| 2021/0167631 A1* | 6/2021 | Sato | H02J 7/02 |
| 2022/0109470 A1* | 4/2022 | Tamaki | H04B 5/28 |
| 2022/0303160 A1* | 9/2022 | Nuebling | H04B 5/75 |

OTHER PUBLICATIONS

Fei Lu et al.; A Double-Sided LC-Compensation Circuit for Loosely Coupled Capacitive Power Transfer, IEEE Transactions on Power Electronics, vol. 33, Issue 2, pp. 1633-1643, Feb. 24, 2017 [retrieved on Nov. 25, 2022], Retrieved from https://doi.org.10.1109/TPEL.2017.2674688, pp. 1-9.

Shaoge Zang et al., Capacitive Power Transfer SYstem with Integrated Wide Bandwidth Communication:, IEEE Transactions on Power Electronics, vol. 37, Issue 8, pp. 8805-8810, Mar. 15, 2022; [retrieved on Nov. 25, 2022], retrieved from https://doi.org/10.1109/TPEL.2022.3158994, pp. 1-5.

\* cited by examiner

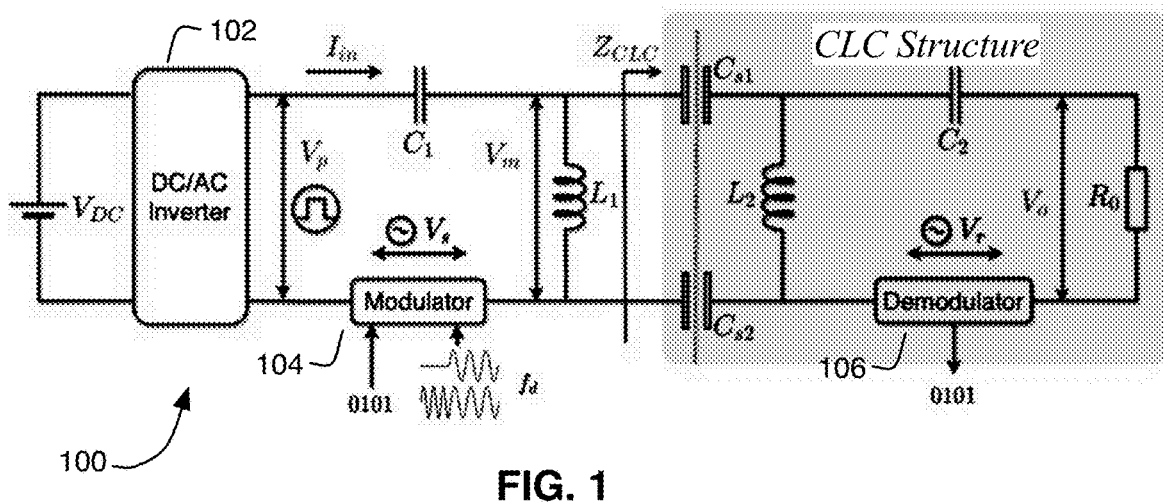

FIG. 1

| | Low Frequency (Power) | High Frequency (Data) |
|---|---|---|
| Frequency: | $\omega_p$ | $> \omega_c$ |
| Function: | Power Amplifier | High-Pass Filter |
| Properties: | CC & ZPA | Butterworth (Flatness) |
| Voltage Gain: | 4.505 | 1 |
| Conditions: | $\begin{cases} \omega_p^2 L_{eq1} C_1 = 1 \\ L_{eq1} = \dfrac{L_1(C_1 L_2 \omega_p^2 - 1)}{C_1 L_1 \omega_p^2 + C_1 L_2 \omega_p^2 - 1} \\ \omega_p^2 L_{eq2} C_2 = 1 \\ L_{eq2} = \dfrac{L_2(C_1 L_1 \omega_p^2 - 1)}{C_1 L_1 \omega_p^2 + C_1 L_2 \omega_p^2 - 1} \end{cases}$ 426 | 422 $\begin{cases} C_2 = 1/(g_1 \omega_c R_0) \\ L_2 = R_0/(g_2 \omega_c) \\ C_3 = 1/(g_3 \omega_c R_0) \end{cases}$<br>424 $\begin{cases} g1 = 1.5 \\ g2 = 4/3 \\ g3 = 0.5 \end{cases}$ |

FIG. 4

CAPACITIVE POWER TRANSFER SYSTEM WITH INTEGRATED WIDE BANDWIDTH COMMUNICATION

CROSS-REFERENCE TO RELATED APPLICATIONS

This application claims priority to U.S. Provisional Application No. 63/265,581, filed Dec. 17, 2021, entitled "CAPACITIVE POWER TRANSFER SYSTEM WITH INTEGRATED WIDE BANDWIDTH COMMUNICATION," the disclosure of which is incorporated by reference in its entirety for all purposes.

BACKGROUND

Capacitive power transfer technology can, in some applications, be a suitable solution for wireless power transfer. Capacitive power transfer can employ two pairs of metal plates to form the capacitors, allowing power to be transferred using alternating electric fields.

To date there has been little focus on providing capacitive power transfer systems that include in-band communication. Challenges to integrating in-band communications into a capacitive power transfer system include potentially high system sensitivity that results in drops in power transfer efficiency and/or capability. Additionally, such systems can be complex, and their communication bandwidth may be limited.

SUMMARY

Disclosed herein is a novel compensation design that can achieve simultaneous power and data transfer in a capacitive power transfer system. One embodiment can be based on a double-sided CL topology. The selected circuit components may be chosen to meet the resonance requirements for power transfer as well as satisfying a high pass condition for communication signals. Thus, the capacitive power transfer system can act as an amplifier at the power channel frequency. Simultaneously, the circuitry can have the properties of a high pass filter at the communication channel frequency. Additionally, in at least some embodiments, there can be an extended frequency region for communication, and this frequency region can be compatible with amplitude modulated ("AM") and/or amplitude shift keyed ("ASK") communications as well as frequency modulated ("FM") or frequency shift keyed ("FSK") communication. In some embodiments, multiple streams of data can be transferred using different frequencies at the same time, which can increase the data transfer capacity.

A capacitive power transfer system can include a power transmitter having one or more primary side filter components, a communications modulator, and transmitter capacitive couplers; and a power receiver having receiver capacitive couplers capacitively coupled to the transmitter capacitive couplers, one or more secondary side filter components, and a communication demodulator. The one or more primary side filter components and the one or more secondary side filter components can be selected to provide power amplifier operation at a power delivery frequency and act as a stable gain high pass filter above a communications cutoff frequency that is higher than the power delivery frequency.

The stable gain high pass filter can be a unity gain high pass filter. The one or more primary side filter components together with the one or more secondary side filter components can form a resonant compensation network having a double-sided CL topology. The resonant compensation network having a double-sided CL topology comprises a first capacitor and a first inductor in the power transmitter and a second capacitor and a second inductor in the power receiver.

The coupler capacitance, inductance of the second inductor, and capacitance of the second capacitor can be determined by:

$$C_s = \frac{1}{g_1\omega_c R_0}; L_2 = \frac{R_0}{g_2\omega_c}; C_2 = \frac{1}{g_3\omega_c R_0}$$

where $C_s$ is a combined capacitance of the transmitter and receiver capacitive couplers, $L_2$ is the inductance of the second inductor, $C_2$ is the capacitance of the second capacitor, $R_0$ is a nominal load resistance, and $g_1$, $g_2$, and $g_3$ are normalized filter coefficients that provide power amplifier operation at a power delivery frequency and act as a stable gain high pass filter above a communications cutoff frequency that is higher than the power delivery frequency. The inductance of the first inductor and the capacitance of the first capacitor can be determined in accordance with:

$$\begin{cases} \omega_{p2}^2 L_{eq1} C_1 = 1; L_{eq1} = \frac{L_1(C_s L_2 \omega_{p2}^2 - 1)}{C_s L_1 \omega_{p2}^2 + C_s L_2 \omega_{p2}^2 - 1} \\ \omega_{p2}^2 L_{eq2} C_2 = 1; L_{eq2} = \frac{L_2(C_s L_2 \omega_{p2}^2 - 1)}{C_s L_1 \omega_{p2}^2 + C_s L_2 \omega_{p2}^2 - 1} \end{cases}$$

where $\omega_{p2}$ is the power system frequency, $L_1$ is the inductance of the first inductor and $C_1$ is the capacitance of the first capacitor.

Alternatively, the inductance of the first inductor, the capacitance of the first capacitor, the inductance of the second inductor and the capacitance of the second capacitor can be determined in accordance with:

$$\omega_{p1}^2 L_1 C_1 = \omega_{p1}^2 L_2 C_2 = 1$$

where $\omega_{p1}$ is the power operating frequency, $L_1$ is the inductance of the first inductor, $L_2$ is the inductance of the second inductor, $C_1$ is the capacitance of the first capacitor, and $C_2$ is the capacitance of the second capacitor.

A method of selecting filter components for a capacitive power transfer system to provide power amplifier operation at a power delivery frequency and act as a stable gain high pass filter above a communications cutoff frequency that is higher than the power delivery frequency can include: determining a coupler capacitance of the capacitive power transfer system, choosing the communication cutoff frequency, selecting a filter type and associated filter coefficients to act as a stable gain high pass filter above a communications cutoff frequency, selecting a frequency tuning method, determining secondary side filter component values based on the selected filter type and associated filter coefficients, and determining primary side filter component values based on the selected frequency tuning method. The constant gain high pass filter can be a stable gain high pass filter. Determining the coupler capacitance of the capacitive power transfer system can include determining the coupler capacitance based on a geometry of one or more capacitive couplers. Choosing the communication cutoff frequency can include selecting a frequency above a power transfer frequency. The selected filter type can be a Butterworth filter.

The primary side filter components together with the secondary side filter components can form a resonant compensation network having a double-sided CL topology. The resonant compensation network having a double-sided CL topology can include a first capacitor and a first inductor in a power transmitter of the wireless power transfer system and a second capacitor and a second inductor in a power receiver of the wireless power transfer system.

The selected frequency tuning method can account for resonant operation of both secondary side and primary side filter components together with the capacitive couplers of the capacitive power transfer system. In that case, a coupler capacitance, inductance of the second inductor, and capacitance of the second capacitor can be determined by:

$$C_s = \frac{1}{g_1 \omega_c R_0}; L_2 = \frac{R_0}{g_2 \omega_c}; C_2 = \frac{1}{g_3 \omega_c R_0}$$

where $C_s$ is a combined capacitance of the transmitter and receiver capacitive couplers, $L_2$ is the inductance of the second inductor, $C_2$ is the capacitance of the second capacitor, $R_0$ is a nominal load resistance, and $g_1$, $g_2$, and $g_3$ are normalized filter coefficients that provide power amplifier operation at a power delivery frequency and act as a stable gain high pass filter above a communications cutoff frequency that is higher than the power delivery frequency. The inductance of the first inductor and the capacitance of the first capacitor can be determined in accordance with:

$$\begin{cases} \omega_{p2}^2 L_{eq1} C_1 = 1; L_{eq1} = \frac{L_1(C_s L_2 \omega_{p2}^2 - 1)}{C_s L_1 \omega_{p2}^2 + C_s L_2 \omega_{p2}^2 - 1} \\ \omega_{p2}^2 L_{eq2} C_2 = 1; L_{eq2} = \frac{L_2(C_s L_2 \omega_{p2}^2 - 1)}{C_s L_1 \omega_{p2}^2 + C_s L_2 \omega_{p2}^2 - 1} \end{cases}$$

where $\omega_{p2}$ is the power system frequency, $L_1$ is the inductance of the first inductor and $C_1$ is the capacitance of the first capacitor.

Alternatively, the selected frequency tuning method can account for resonant operation of just the primary side filter components. In that case, the inductance of the first inductor, capacitance of the first capacitor, inductance of the second inductor, and the capacitance of the second capacitor are determined in accordance with:

$$\omega_{p1}^2 L_1 C_1 = \omega_{p1}^2 L_2 C_2 = 1$$

where $\omega_{p1}$ is the power operating frequency, $L_1$ is the inductance of the first inductor, $L_2$ is the inductance of the second inductor, $C_1$ is the capacitance of the first capacitor, and $C_2$ is the capacitance of the second capacitor.

BRIEF DESCRIPTION OF THE DRAWINGS

FIG. 1 illustrates an exemplary capacitive power transfer system.

FIG. 4 illustrates a summary of power mode and communication mode operation of a capacitive power transfer system.

DETAILED DESCRIPTION

Figure 2:
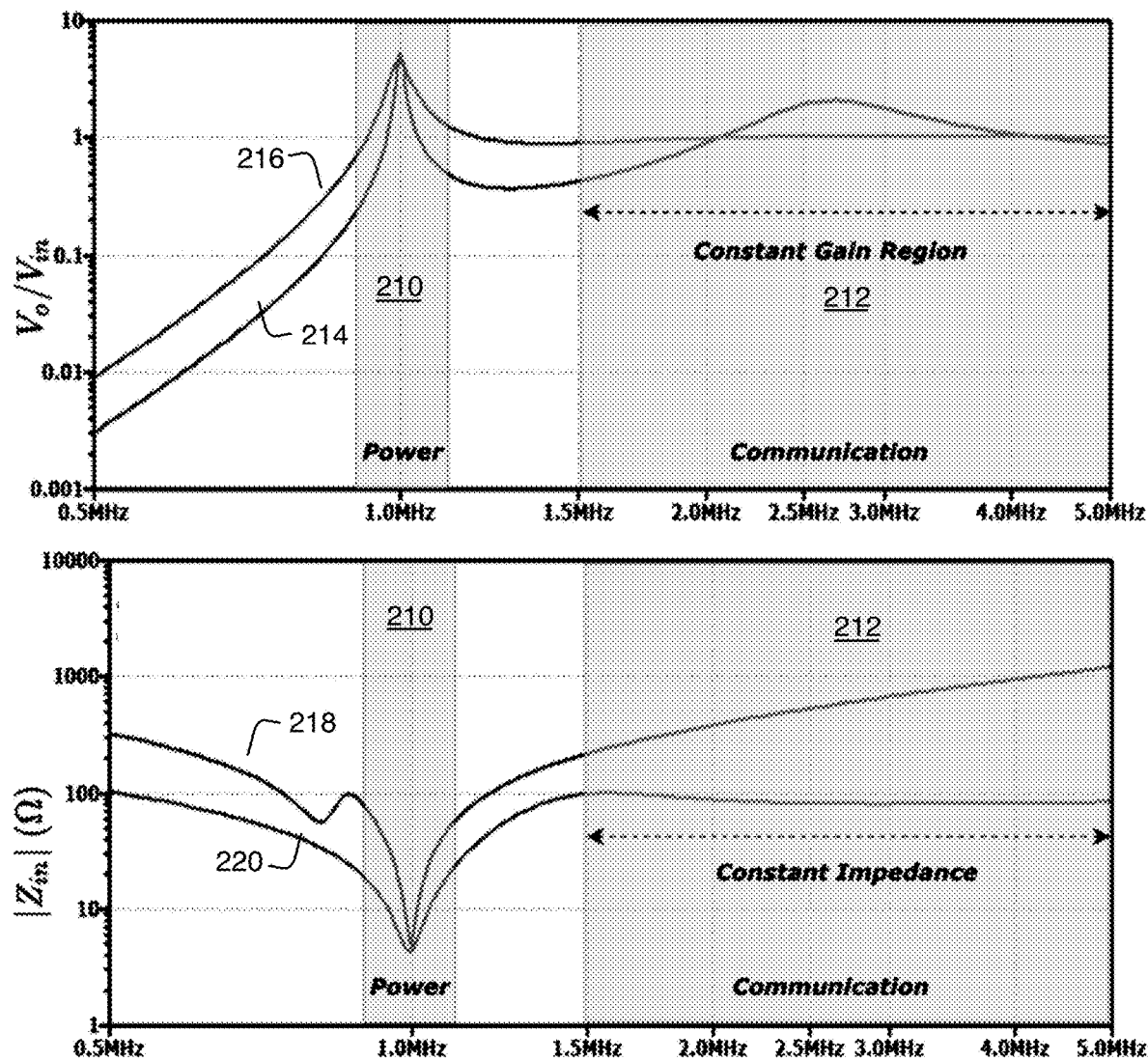
FIG. 2 illustrates exemplary voltage gain and input impedance curves for exemplary capacitive power transfer systems.

In the following description, for purposes of explanation, numerous specific details are set forth to provide a thorough understanding of the disclosed concepts. As part of this description, some of this disclosure's drawings represent structures and devices in block diagram form for sake of simplicity. In the interest of clarity, not all features of an actual implementation are described in this disclosure. Moreover, the language used in this disclosure has been selected for readability and instructional purposes, has not been selected to delineate or circumscribe the disclosed subject matter. Rather the appended claims are intended for such purpose.

Various embodiments of the disclosed concepts are illustrated by way of example and not by way of limitation in the accompanying drawings in which like references indicate similar elements. For simplicity and clarity of illustration, where appropriate, reference numerals have been repeated among the different figures to indicate corresponding or analogous elements. In addition, numerous specific details are set forth to provide a thorough understanding of the implementations described herein. In other instances, methods, procedures, and components have not been described in detail so as not to obscure the related relevant function being described. References to "an," "one," or "another" embodiment in this disclosure are not necessarily to the same or different embodiment, and they mean at least one. A given figure may be used to illustrate the features of more than one embodiment, or more than one species of the disclosure, and not all elements in the figure may be required for a given embodiment or species. A reference number, when provided in a given drawing, refers to the same element throughout the several drawings, though it may not be repeated in every drawing. The drawings are not to scale unless otherwise indicated, and the proportions of certain parts may be exaggerated to better illustrate details and features of the present disclosure.

FIG. 1 illustrates an exemplary capacitive power transfer system 100. A DC source VDC can be connected to a DC/AC inverter 102 to power the capacitive power transfer system. Inverter 102 can generate an output voltage $V_p$ that can be used for power transfer to the secondary. A double-sided CL topology including capacitors $C_1$ and $C_2$ and inductors $L_1$ and $L_2$ may be used as a resonant compensation network. Other resonant compensation network topologies could also be used if appropriate to a given application. The capacitive couplers $C_{s1}$ and $C_{s2}$ separate the primary and secondary sides. On the secondary side, an output voltage $V_o$ can power a load, represented by resistor $R_0$.

For communication between the primary side (also known as a power transmitter or PTx) and the secondary side (also known as a power receiver or PRx), a data stream (e.g., 0101) can be injected into the main power loop on the primary side by a series modulator 104. This series modulator can introduce a series voltage Vs that adds to (or subtracts from, depending on polarity) the inverter output voltage $V_p$. The resultant total voltage $V_m$ is thus the voltage that is capacitively coupled to the secondary side. On the secondary side, the resultant voltage includes the output voltage $V_o$ and a received voltage $V_r$. The received voltage $V_r$ corresponds to the input series voltage Vs corresponding to the modulated data. Received voltage $V_r$ may be received/ detected by demodulation circuit 106 on the secondary side and demodulated to recover the data stream (0101). Both modulator 104 and demodulator 106 can be designed with a common data carrier frequency $f_d$. In at least some embodiments, the data carrier frequency $f_d$ may be higher, perhaps substantially higher, than the power transfer frequency, as is described in greater detail below.

Figure 3:
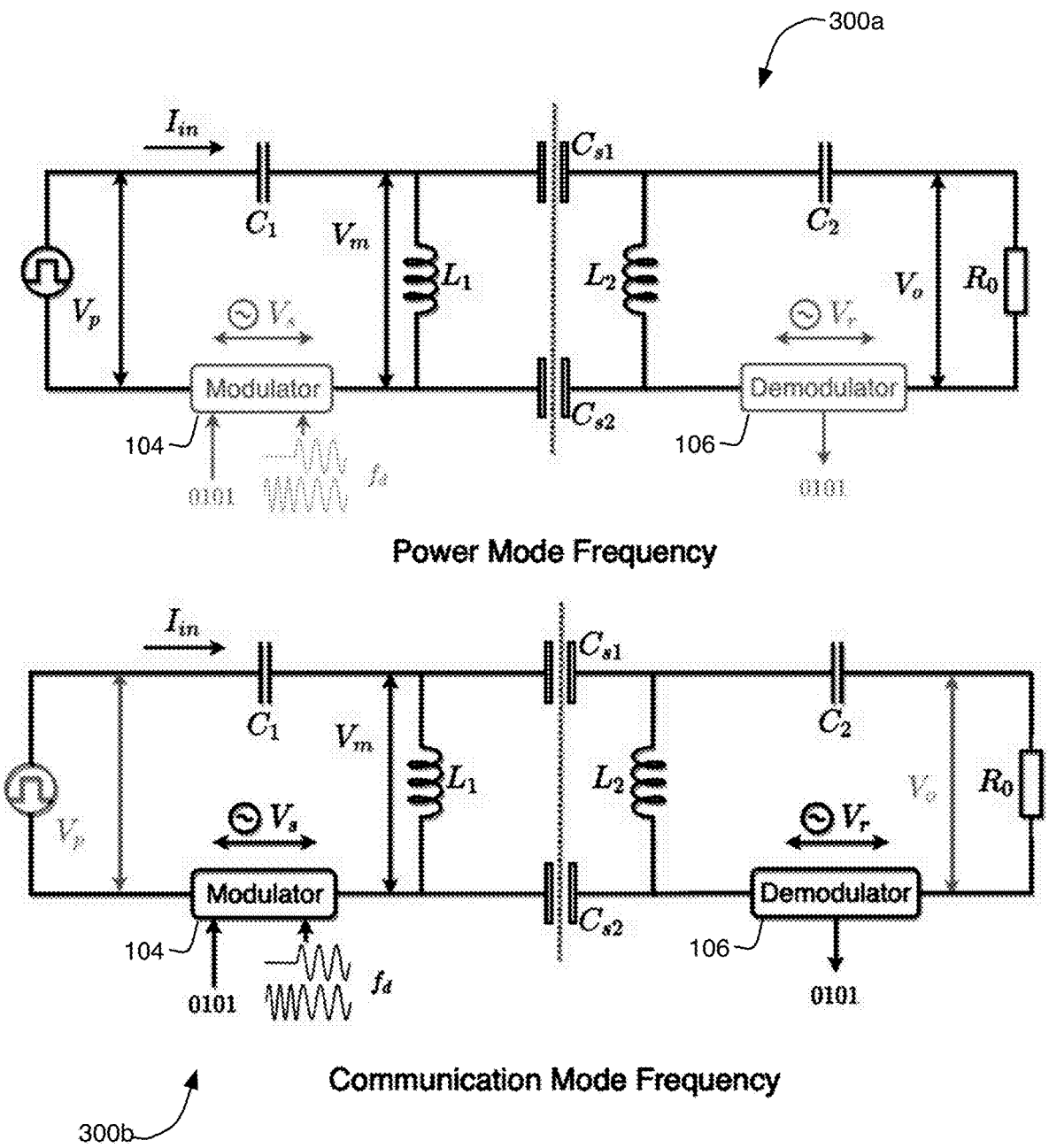
FIG. 3 illustrates a capacitive power transfer system in a power mode and a communications mode, in which the respective modes may be considered independently.

The capacitive power transfer system input voltage ($V_m$) can thus be defined as the sum of the voltages from two sources, i.e., inverter 102 (having output voltage $V_p$, corresponding to the power transfer voltage) and modulator 104 (having output voltage Vs, corresponding to the modulated input data stream). Because $V_p$ and Vs are independent sources of two different frequencies, the superposition theorem can be applied to analyze the system. In other words, as illustrated in FIG. 3, the power mode 300a (i.e., the circuit at the power transfer frequency) may be considered independently of communication mode 300b (i.e., the circuit at the communication mode frequency). Thus, in the power mode 300a, modulator 104 and demodulator 106 and corresponding signals Vs and $V_r$ may be "ignored," as conveyed by the lighter line weight used to depict these elements in the schematic of power mode 300a. Likewise, in the communication mode 300b inverter 102 (FIG. 1) (and its output $V_p$) and the power supply voltage $V_o$ to the load $R_0$ may be "ignored," as conveyed by the lighter line weight used to depict these elements in the schematic of communications mode 300b.

FIG. 2 illustrates exemplary voltage gain and input impedance curves for exemplary capacitive power transfer systems. Because these figures correspond to a particular example, the exact gain, impedance, and frequency values are not critical. Rather, these figures are provided to illustrate general characteristics. FIG. 2 also depicts an exemplary "power transfer frequency region" 210, corresponding to relatively narrow frequency band centered on 1 MHz (although other frequencies could be used for wireless power transfer) and an exemplary "communication frequency region" 212 above 1.5 MHz and, more particularly from 1.5 MHz to 5 MHz, although other frequencies could be used. It is expected that in most applications the communication frequency will be above the power transfer frequency. As noted above with respect to FIG. 1, the capacitive power transfer system can include a compensation network. In the illustrated embodiment, the compensation network is the double-sided CL arrangement including capacitors $C_1$ and $C_2$ and inductors $L_1$ and $L_2$. (However, other compensation network topologies could be used as appropriate for a given application.) One aspect of designing the compensation networks for a capacitive power transfer system is to improve the system power rating and power transfer efficiency by tuning the capacitive power transfer system at a specified operating frequency. In prior art compensation network designs, the output voltage gain fluctuates when operating above the power transfer frequency, as illustrated by the variation of curve 214 in communication frequency region 212 of FIG. 2. This property can make it more difficult to integrate an in-band communications feature into a capacitive power transfer system tuned in accordance with the prior art and can also substantially limit the effective bandwidth of the communication channel.

Conversely, by employing the compensation network tuning/selection techniques described in greater detail below, one can use the CLC compensation network characteristics to shape a stable voltage gain curve in the higher frequency communication region. An example of a more stable voltage gain curve in the higher frequency communication region is illustrated by exemplary gain curve 216 in FIG. 2. By stable gain in the communication frequency region, it is meant that the voltage gain curve of the capacitive power transfer system exhibits a gain characteristic over a region of interest in the communications frequency region that is sufficiently constant to allow for suitable operation of the communication modulator and demodulator circuitry at desired and acceptable data and error rates. As a general rule, higher desired data rates and lower error rates will both require a higher communications bandwidth, which can be correlated with a broader frequency range over which the stable gain characteristic is exhibited. In some embodiments the stable gain can be approximately unity (i.e., 1), although other stable gain values could be used if appropriate for a given embodiment or application.

Correspondingly, impedance curve 218 illustrates impedance versus frequency for typical prior art capacitive power transfer system compensation networks. As can be seen, there is a significant impedance minimum occurring at the power transfer frequency (i.e., the center of power transfer frequency region 210), which correlates with best power transfer performance (i.e., maximized power transfer level and efficiency) at this frequency. Conversely, the effective impedance is higher and variable for other frequencies, including frequencies in the communication frequency region 212. As an alternative to this result, a compensation network selected according to the principles described herein can exhibit an impedance curve 220 illustrating improved impedance characteristics. As with the prior art compensation network, impedance curve 220 exhibits minimal impedance in the power transfer frequency region 210 with a significant minimum at the center of the power transfer frequency region. However, impedance curve 220 also exhibits a "constant" impedance over the communication frequency region 212. "Constant" impedance in this context has a meaning that is analogous to "stable gain" as defined above, meaning that the impedance exhibits an impedance value over the region of interest that allows for suitable operation of the modulation circuitry at the data rates and error rates of interest. FIG. 2 depicts the magnitude of the impedance, but phase of the complex impedance of the system may also be considered.

In other words, a data carrier frequency in the "stable gain/constant impedance" communication frequency region 212 will not have any attenuation (or phase shift) that interferes with modulator/demodulator operation. Using the compensation network design/selection techniques herein, data can be transferred over a wider band than prior art systems, as can be seen from the exemplary curves discussed above with respect to FIG. 2. This can allow for increased bandwidth for the communication channel in the capacitive power transfer system. Also, in at least some embodiments, additional/multiple data transfer frequencies can be used to transfer multiple threads or streams of data at the same time to improve data transfer capacity. Likewise, data can be transferred alongside the power delivery without adversely affecting the power transfer capability or efficiency. With different modulator designs, the proposed techniques can be used with both amplitude-based (e.g., amplitude modulation/AM or amplitude shift keying/ASK) and frequency based (e.g., frequency modulation/FM or frequency shift keying/FSK) modulations.

The design process (including component value selection) for a suitable CLC compensation/filter circuit can be conducted as described below with reference to the schematics of FIGS. 1 and 3 and the equations and parameters of FIG. 4. Thereafter, a design flow is discussed with respect to FIG. 5. According to prior art design techniques, the secondary CL section (i.e., capacitor $C_2$ and inductor $L_2$) would typically have been designed/selected to step down or reduce the voltage and to step up or increase the current delivered to load $R_0$. According to the present technique, the design process preserves this functionality of the secondary CL section, but also incorporates the coupling capacitance $C_s$ (i.e., the combination of couplers $C_{s1}$ and $C_{s2}$), serving as a CLC high-pass filter. It will be appreciated that the coupling capacitance $C_s$ is effectively the parallel combination of $C_{s1}$ and $C_{s2}$, and thus:

$$C_s = \frac{C_{s1} C_{s2}}{C_{s1} + C_{s2}}$$

The proposed design technique can begin with selecting cutoff frequency $\omega_c$ and nominal load resistance $R_0$. The cutoff frequency can be the lower bound of the communications region, e.g., 1.5 MHz as depicted in FIG. 2 (although any suitable frequency could be used). A third order CLC high-pass filter could then be designed using equations 422 (FIG. 4) as follows:

$$C_s = \frac{1}{g_1 \omega_c R_0}; \quad L_2 = \frac{R_0}{g_2 \omega_c}; \quad C_2 = \frac{1}{g_3 \omega_c R_0}$$

where $C_s$ is the combined coupler capacitance, $L_2$ is the secondary side inductance, $C_2$ is the second side capacitance, $R_0$ is the nominal load resistance, and $g_1$, $g_2$, and $g_3$ are the normalized filter coefficients. In many capacitive power transfer applications, the coupling capacitance $C_s$ may be a given value determined by the physical configuration of the couplers. Based on the foregoing, the component values for $L_2$ and $C_2$ can be determined by selection of the filter coefficients. As one example, a Butterworth filter design may be selected to ensure substantial flatness of the output voltage gain (as discussed above). One exemplary set of filter coefficients (also given at 424, FIG. 4) could be:

$$g_1 = 1.5; \quad g_2 = \frac{4}{3}; \quad g_3 = 0.5$$

Given the coefficients from above, the transfer function of voltage gain in the CLC section can then be expressed as:

$$G_2(s)|_{\omega > \omega_c} = \frac{V_o(s)}{V_m(s)} = \frac{s^3}{s^3 + 2\omega_c s^2 + 2\omega_c^2 s + \omega_c^3} \approx 1$$

where $G_2(s)$ is the s-domain transfer function for frequencies above the cutoff frequency $\omega_c$, $V_o$ is the output voltage, and $V_m$ is the input voltage of the CLC section. As the frequency $\omega$ increases beyond the cutoff frequency $\omega_c$, the voltage gain ratio G2 converges to 1. The input impedance of the CLC structure ZCLC (shown in FIG. 1) becomes purely resistive, a constant of $R_0$. In other words, as $\omega$ becomes larger than $\omega_c$, the real and imaginary parts of ZCLC are given by:

$$\begin{cases} \mathcal{R}(Z_{CLC})\big|_{\omega > \omega_c} = \frac{9 R_0 \omega^4}{9\omega^4 + 4\omega^2 \omega_c^2 + 4\omega_c^4} \approx R_0 \\ \mathcal{J}(Z_{CLC})\big|_{\omega > \omega_c} = \frac{(-6 R_0 \omega_c^2)\omega^4 + (-3 R_0 \omega_c^3)\omega^2 - 6 R_0 \omega_c^5}{9\omega^5 + 4\omega^3 \omega_c^2 + 4\omega_c^4 \omega} \approx 0 \end{cases}$$

Based on the foregoing equation, the voltage gain of the primary side CL section (made up of $L_1$ and $C_1$) can be defined as $G_1$, and the overall system voltage gain as $G(s)$, which yields:

$$G_1(s)|_{\omega > \omega_c} = \frac{V_m(s)}{V_s(s)} = \frac{L_1 C_1 R_0 s^2}{L_1 C_1 R_0 s^2 + L_1 s + R_0}$$

$$G(s)|_{\omega > \omega_c} = \left|\frac{V_o(s)}{V_s(s)}\right| = G_1(s) G_2(s) \approx G_1(s)$$

In the communication frequency band (above $w_c$), overall gain of the system $G(s)$ is the product of the primary CL section gain $G_1$ and the secondary CL section gain ($G_2$, which is equal to $R_0$ in the region of interest). In other words, the secondary CL section acts like a stable gain (and in this example unity gain) high pass filter over the range of communication frequencies.

Thus, for frequencies above the cutoff frequency (i.e., $\omega > \omega_c$), the system voltage gain $G(s)$ is mainly governed by the primary CL section. The primary CL section can obtain the desired high-pass characteristics by use of the cascaded CLC structure. Additionally, the double-sided CL compensation network can also be resonant at the power operating frequency $\omega p$ (typically lower than the communications frequency) to accommodate the power needs. This suggests that the following conditions (426, FIG. 4) should be met:

$$\begin{cases} \omega_{p2}^2 L_{eq1} C_1 = 1; \quad L_{eq1} = \frac{L_1(C_s L_2 \omega_{p2}^2 - 1)}{C_s L_1 \omega_{p2}^2 + C_s L_2 \omega_{p2}^2 - 1} \\ \omega_{p2}^2 L_{eq2} C_2 = 1; \quad L_{eq2} = \frac{L_2(C_s L_2 \omega_{p2}^2 - 1)}{C_s L_1 \omega_{p2}^2 + C_s L_2 \omega_{p2}^2 - 1} \end{cases}$$

where $\omega_{p2}$ is the power system frequency, $L_1$ is the primary side filter inductance, $C_1$ is the primary side filter capacitance, and Cs, $C_2$, and $L_2$ are as described above.

By solving the system of equations given by 422, 424, and 426 (FIG. 4), the input impedance Zin is given by:

$$Z_{in} = \frac{V_{in}}{I_{in}} = \frac{C_s^2 L_1^2 L_2^2 \omega_2^6}{R_0(C_s L_1 \omega_2^2 + C_s L_2 \omega_2^2 - 1)^2}$$

The above equation states that the system input impedance does not have any imaginary (i.e., reactive) component, which implies that a zero phase angle condition will hold. If a symmetrical design is applied, the inductor value could be selected as:

$$L_2 = \frac{g_1 + 2g_3 - \sqrt{g_1^2 + 4g_3^2}}{2 C_s g_1 \omega_{p2}^2} \approx \frac{0.232}{C_s \omega_{p2}^2}$$

The relationship between cutoff frequency and system operating frequency can thus be expressed as:

$$\frac{\omega_{p2}}{\omega_c} = \frac{\sqrt{2g_2}\sqrt{g_1 + 2g_3 + \sqrt{g_1^2 + 4g_3^2}}}{2} \approx 0.682$$

and the voltage gain in the power channel can be calculated as approximately 4.505 (for the given example) at the power operating frequency. Moreover, as the frequency rises above the cutoff frequency $\omega_c$, the gain G1 corresponding to the primary side components will approach a stable value (in the illustrated example, 1).

Thus, as summarized in FIG. 4, the CLC filter structure, operating at the power frequency $\omega_p$ (i.e., in the power transfer frequency region 210), will effectively act as a power amplifier, having a voltage gain greater than 1 (4.505 in the illustrated example), constant current, and zero phase angle operation, and satisfying the conditions given by equation 426 (FIG. 4). Operating above the cutoff frequency $\omega_c$ (i.e., in the communication frequency region 212), the CLC filter structure will operate as a high pass filter (e.g., a Butterworth filter) with a stable gain, satisfying equations 422 and 424 (FIG. 4).

In the above description, the power frequency tuning was determined with the circuit resonance being considered with the couplers included, i.e., for the primary and secondary side components. As an alternative, the power frequency tuning can be performed using an alternative technique in which resonance of only the primary side components ($C_1$, $L_1$) is considered. According to this technique, equations 426 (FIG. 4) may be replaced with:

$$\omega_{p1}^2 L_1 C_1 = \omega_{p1}^2 L_2 C_2 = 1$$

in which $\omega_{p1}$ is the power operating frequency and $L_1$, $L_2$, $C_1$, $C_2$ are as given above. The output voltage gain $G_p$ and the input impedance phase angle $\theta_1$ in the power channel then can thus be given by:

$$G_p = \left|\frac{V_{out}}{V_{in}}\right| = \frac{C_1}{C_2}$$

$$\theta_1 = \tan^{-1}\left(\frac{C_2^2 R_0 \omega_{p1}}{C_s} - \frac{C_2 R_0 \omega_{p1}(C_1 + C_2)}{C_1}\right)$$

Solving the system of equations given by 422, 424, and the above replacement for equations 426 (FIG. 4), the following relationship may be derived between the cutoff frequency $\omega_c$ and the power frequency $\omega_{p1}$:

$$\frac{\omega_{p1}}{\omega_c} = \sqrt{g_2 g_3} \approx 0.816$$

If a symmetrical design is applied, stable (and unity) gain may be achieved, but it is not possible to obtain zero phase angle. To obtain zero phase angle, $C_1$ can be selected to equal 1.5 $C_s$. Then, with $C_1$ equal to 0.5 $C_2$, the output voltage is half of the input voltage. In either case, as the frequency increases above the cutoff frequency $\omega_c$ (i.e., into communication frequency region 212), the gain will tend toward a stable value of 1; however, the disadvantage of this approach is lower gain and/or a phase shift in the power transfer frequency region 210.

Figure 5:
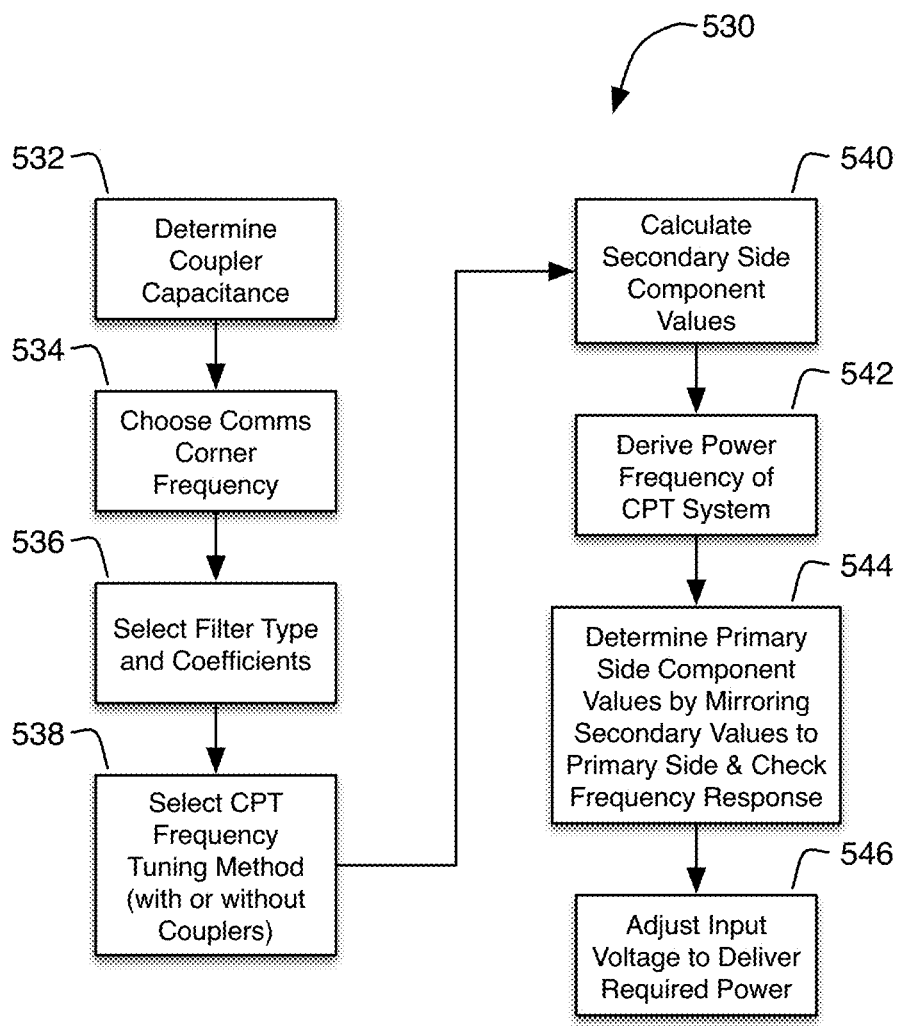
FIG. 5 is a flow chart illustrating a design process for a capacitive power transfer system with in-band communications.

FIG. 5 depicts a process for selecting component values of a CLC filter as described above. Beginning in block 532, the coupler capacitance can be determined. As noted above, this can be determined as a function of the physical configuration of the coupler. In block 534, a communication cutoff frequency $\omega_c$ may be selected. Then, in block 536 a filter type and coefficients may be determined. This provides the relationships 422 and 424 (FIG. 4) for the secondary side components. In block 538, a frequency tuning method (either with or without couplers as described above) is determined. The selected frequency tuning method determines whether relationships 426 are used (as in the couplers included tuning method) or the substitute relationships discussed above (as discussed above) are used to determine the primary side component values.

In the case of either tuning method, in block 540, the secondary side component values, e.g., $L_2$, $C_2$, may be calculated. Then, in block 542, the power frequency ($\omega_{p1}$ or $\omega_{p2}$, as appropriate) may be derived. In block 544, the secondary component values may be mirrored to the primary side, and the frequency response of the entire system checked. The relationships between the secondary side filter component values and the primary side filter component values will be determined by the selected tuning method, as discussed above. Finally, in block 546, an input voltage may be selected to provide the required power delivery to the load.

The foregoing describes exemplary embodiments of wireless power transfer transmitters, receivers, and systems using circuit designs that provide for improved in-band communications properties. Such systems may be used in a variety of applications but may be particularly advantageous when used in conjunction with wireless power transfer systems personal electronic devices such as a mobile phones, smart watches, and/or tablet computers including accessories for such devices such as wireless earphones, styluses, and the like. However, any wireless power transfer system for which increased overall efficiency is desired may advantageously employ the techniques described herein. Although numerous specific features and various embodiments have been described, it is to be understood that, unless otherwise noted as being mutually exclusive, the various features and embodiments may be combined in various permutations in a particular implementation. Thus, the various embodiments described above are provided by way of illustration only and should not be constructed to limit the scope of the disclosure. Various modifications and changes can be made to the principles and embodiments herein without departing from the scope of the disclosure and without departing from the scope of the claims.

The invention claimed is:

1. A capacitive power transfer system comprising:
    a power transmitter having one or more primary side filter components, a communications modulator, and transmitter capacitive couplers; and
    a power receiver having receiver capacitive couplers capacitively coupled to the transmitter capacitive couplers, one or more secondary side filter components, and a communication demodulator;
    wherein the one or more primary side filter components and the one or more secondary side filter components form a passive filter network and are selected to provide power amplifier operation at a power delivery frequency and act as a stable gain high pass filter above a communications cutoff frequency that is higher than the power delivery frequency.

2. The capacitive power transfer system of claim 1 wherein the stable gain high pass filter is a unity gain high pass filter.

3. The capacitive power transfer system of claim 1 wherein the one or more primary side filter components together with the one or more secondary side filter components comprise a resonant compensation network having a double-sided CL topology.

4. The capacitive power transfer system of claim 3 wherein the resonant compensation network having a double-sided CL topology comprises a first capacitor and a first inductor in the power transmitter and a second capacitor and a second inductor in the power receiver.

5. The capacitive power transfer system of claim 4 wherein a coupler capacitance of the transmitter and receiver capacitive couplers, inductance of the second inductor, and capacitance of the second capacitor are determined by:

$$C_s = \frac{1}{g_1 \omega_c R_0}; L_2 = \frac{R_0}{g_2 \omega_c}; C_2 = \frac{1}{g_3 \omega_c R_0}$$

where $C_s$ is a combined capacitance of the transmitter and receiver capacitive couplers, $L_2$ is the inductance of the second inductor, $C_2$ is the capacitance of the second capacitor, $\omega_c$ is the communications cutoff frequency, $R_0$ is a nominal load resistance, and $g_1$, $g_2$, and $g_3$ are normalized filter coefficients that provide power amplifier operation at the power delivery frequency and act as the stable gain high pass filter above the communications cutoff frequency that is higher than the power delivery frequency.

6. The capacitive power transfer system of claim 5 wherein the inductance of the first inductor and the capacitance of the first capacitor are determined in accordance with:

$$\begin{cases} \omega_{p2}^2 L_{eq1} C_1 = 1; L_{eq1} = \frac{L_1(C_s L_2 \omega_{p2}^2 - 1)}{C_s L_1 \omega_{p2}^2 + C_s L_2 \omega_{p2}^2 - 1} \\ \omega_{p2}^2 L_{eq2} C_2 = 1; L_{eq2} = \frac{L_2(C_s L_2 \omega_{p2}^2 - 1)}{C_s L_1 \omega_{p2}^2 + C_s L_2 \omega_{p2}^2 - 1} \end{cases}$$

where $\omega_{p2}$ is the power system frequency, $L_1$ is the inductance of the first inductor and $C_1$ is the capacitance of the first capacitor.

7. The capacitive power transfer system of claim 4 wherein the inductance of the first inductor, the capacitance of the first capacitor, the inductance of the second inductor and the capacitance of the second capacitor are determined in accordance with:

$$\omega_{p1}^2 L_1 C_1 = \omega_{p1}^2 L_2 C_2 = 1$$

where $\omega_{p1}$ is the power operating frequency, $L_1$ is the inductance of the first inductor, $L_2$ is the inductance of the second inductor, $C_1$ is the capacitance of the first capacitor, and $C_2$ is the capacitance of the second capacitor.

8. A method of selecting filter components and providing a capacitive power transfer system comprising primary side filter components, transmitter capacitive couplers, receiver capacitive couplers capacitively coupled to the transmitter capacitive couplers, and secondary side filter components, to provide power amplifier operation at a power delivery frequency and act as a stable gain high pass filter above a communications cutoff frequency that is higher than the power delivery frequency, the method comprising:
- determining a coupler capacitance of the transmitter capacitive couplers and the receiver capacitive couplers;
- choosing the communications cutoff frequency;
- selecting a filter type and associated filter coefficients of a passive filter network to act as the stable gain high pass filter above the communications cutoff frequency and to provide power amplifier operation at the power delivery frequency;
- selecting a frequency tuning method;
- determining values of the secondary side filter components based on the selected filter type and associated filter coefficients;
- determining values of the primary side filter components based on the selected frequency tuning method; and
- coupling the primary side filter components with the transmitter capacitive couplers and the receiver capacitive couplers with the secondary side filter components to form the passive filter network.

9. The method of claim 8 wherein the stable gain high pass filter is a unity gain high pass filter.

10. The method of claim 8 wherein determining the coupler capacitance of the the transmitter capacitive couplers and receiver capacitive couplers further comprises determining the coupler capacitance based on a geometry of one or more of the transmitter and receiver capacitive couplers.

11. The method of claim 8 wherein choosing the communications cutoff frequency comprises selecting a frequency above the power delivery frequency.

12. The method of claim 8 wherein the selected filter type is a Butterworth filter.

13. The method of claim 8 wherein the primary side filter components together with the secondary side filter components comprise a resonant compensation network having a double-sided CL topology.

14. The method of claim 13 wherein the resonant compensation network having a double-sided CL topology includes a first capacitor and a first inductor in a power transmitter of the capacitive power transfer system and a second capacitor and a second inductor in a power receiver of the capacitive power transfer system.

15. The method of claim 14 wherein the selected frequency tuning method accounts for resonant operation of both secondary side and primary side filter components together with the capacitive couplers of the capacitive power transfer system.

16. The method of claim 15 wherein a coupler capacitance of the transmitter and receiver capacitive couplers, inductance of the second inductor, and capacitance of the second capacitor are determined by:

$$C_s = \frac{1}{g_1 \omega_c R_0}; L_2 = \frac{R_0}{g_2 \omega_c}; C_2 = \frac{1}{g_3 \omega_c R_0}$$

where $C_s$ is a combined capacitance of the transmitter and receiver capacitive couplers, $L_2$ is the inductance of the second inductor, $C_2$ is the capacitance of the second capacitor, $\omega_c$ is the communications cutoff frequency, $R_0$ is a nominal load resistance, and $g_1$, $g_2$, and $g_3$ are normalized filter coefficients that provide power amplifier operation at the power delivery frequency and act as the stable gain high pass filter above the communications cutoff frequency that is higher than the power delivery frequency.

17. The method of claim 16 wherein the inductance of the first inductor and the capacitance of the first capacitor are determined in accordance with:

$$\begin{cases} \omega_{p2}^2 L_{eq1} C_1 = 1; L_{eq1} = \dfrac{L_1 (C_s L_2 \omega_{p2}^2 - 1)}{C_s L_1 \omega_{p2}^2 + C_s L_2 \omega_{p2}^2 - 1} \\ \omega_{p2}^2 L_{eq2} C_2 = 1; L_{eq2} = \dfrac{L_2 (C_s L_2 \omega_{p2}^2 - 1)}{C_s L_1 \omega_{p2}^2 + C_s L_2 \omega_{p2}^2 - 1} \end{cases}$$

where $\omega_{p2}$ is the power system frequency, $L_1$ is the inductance of the first inductor and $C_1$ is the capacitance of the first capacitor.

18. The method of claim 14 wherein the selected frequency tuning method accounts for resonant operation of just the primary side filter components.

19. The method of claim 18 wherein the inductance of the first inductor, capacitance of the first capacitor, inductance of the second inductor, and the capacitance of the second capacitor are determined in accordance with:

$$\omega_{p1}^2 L_1 C_1 = \omega_{p1}^2 L_2 C_2 = 1$$

where $\omega_{p1}$ is the power operating frequency, $L_1$ is the inductance of the first inductor, $L_2$ is the inductance of the second inductor, $C_1$ is the capacitance of the first capacitor, and $C_2$ is the capacitance of the second capacitor.

* * * * *